United States Patent [19]
Honey et al.

[11] Patent Number: 5,564,698
[45] Date of Patent: Oct. 15, 1996

[54] ELECTROMAGNETIC TRANSMITTING HOCKEY PUCK

[75] Inventors: Stanley K. Honey, Palo Alto; Richard H. Cavallaro, Mountain View; David B. Hill, Los Angeles; Fred J. Heinzmann, Los Altos; Alan C. Phillips, Los Altos; Harold Guthart, Los Altos; Alan A. Burns, Portola Valley; Charles L. Rino, Menlo Park; Philip C. Evans, Portola Valley, all of Calif.

[73] Assignee: Fox Sports Productions, Inc., Los Angeles, Calif.

[21] Appl. No.: 498,009

[22] Filed: Jun. 30, 1995

[51] Int. Cl.⁶ .................................................. A63B 71/04
[52] U.S. Cl. ............................ 273/128 R; 773/57.2; 773/58 R; 773/58 G; 473/200; 473/353
[58] Field of Search ..................... 273/128 R, 128 A, 273/128 CS, 57.2, 58 R, 58 G, 213

[56] References Cited

U.S. PATENT DOCUMENTS

| | | |
|---|---|---|
| 3,351,347 | 11/1967 | Smith et al. ............................ 273/58 G |
| 3,840,699 | 10/1974 | Bowerman . |
| 3,944,738 | 3/1976 | Johnson . |
| 4,064,528 | 12/1977 | Bowerman . |
| 4,183,536 | 1/1980 | Platt . |
| 4,700,306 | 10/1987 | Wallmander . |
| 4,846,475 | 7/1989 | Newcomb et al. . |
| 4,957,297 | 9/1990 | Newcomb et al. ..................... 273/213 |
| 4,968,036 | 11/1990 | Von Der Mark . |
| 5,082,263 | 1/1992 | Berger . |
| 5,149,096 | 9/1992 | Keating et al. . |
| 5,150,895 | 9/1992 | Berger . |
| 5,179,421 | 1/1993 | Parker et al. . |
| 5,184,820 | 2/1993 | Keating et al. . |
| 5,207,720 | 5/1993 | Shepherd . |
| 5,268,734 | 12/1993 | Parker et al. . |
| 5,340,108 | 8/1994 | Gerpheide et al. . |
| 5,346,210 | 9/1994 | Utke et al. . |
| 5,388,825 | 2/1995 | Myers et al. ............................ 273/58 G |
| 5,392,088 | 2/1995 | Abe et al. . |
| 5,413,345 | 5/1995 | Nauck . |
| 5,419,562 | 5/1995 | Cromarty . |
| 5,419,565 | 5/1995 | Gordon et al. . |
| 5,423,549 | 6/1995 | Englmeier ............................ 273/58 GX |

FOREIGN PATENT DOCUMENTS

| | | |
|---|---|---|
| 2106336 | 3/1994 | Canada . |
| 1659078 | 6/1991 | U.S.S.R. .............................. 273/58 G |
| WO95/10915 | 4/1995 | WIPO . |

OTHER PUBLICATIONS

Replay 2000—The Ultimate Workstation for Sport Commentators and Producers, Orad Hi-Tec Systems.
SailTrack, GPS Tracking System for Animated Graphics Broadcast Coverage of the America's Cup Races.
SailTrack Technical Overview.
Sail Viz Software Documentation.

Primary Examiner—Raleigh W. Chiu
Attorney, Agent, or Firm—Fliesler, Dubb, Meyer & Lovejoy LLP

[57] ABSTRACT

A hockey puck with an electromagnetic transmitter. The electromagnetic transmitter could include an infrared transmitter, ultraviolet transmitter, radar repeater, RF transmitter or other device for transmitting electromagnetic waves outside of the visible spectrum. The electromagnetic transmitter is turned on using a shock sensor and is turned off using a timer.

26 Claims, 7 Drawing Sheets

ELECTROMAGNETIC TRANSMITTING HOCKEY PUCK

BACKGROUND OF THE INVENTION

1. Field of the Invention

The present invention is directed to a hockey puck that transmits electromagnetic signals which permit the enhancement of the image of the puck on a television monitor without affecting the appearance of the puck to the hockey players or spectators at the hockey rink.

2. Description of the Related Art

Hockey has become a popular sport worldwide. Active participation in hockey games and fan attendance have increased substantially. However, the number of viewers watching professional hockey games on television has not increased proportionally.

Hockey has not been a very popular sport for television viewing because of the problems in the television coverage of hockey. When hockey was first broadcasted on television, the bright white color of the ice would overwhelm early television cameras causing the image on the television screen to suffer from huge glare. The solution, at the time, was to die the ice light blue. Camera technology has since solved the brightness problem.

Today, television viewing of a hockey game is hampered by poor visibility and distortion of the hockey puck. The puck is small, and is passed, shot and deflected at high speeds. A standard hockey puck is three inches in diameter and one inch high. A television viewer sees only a limited portion of the ice and the scene being viewed changes rapidly as the camera moves to follow the action. In order to be able to view all areas of the ice rink, cameras must be located far from the ice rink. Thus, on a 19" television screen, a standard hockey puck tends to appear as a small dot on the screen. As a result, it is difficult to follow the puck from player to player, and it is especially difficult to follow the puck as it is shot toward the goal and either deflected, caught or missed by the goalie. For most viewers, recognizing that a goal has been scored probably comes after the fact when a signal light is lit or the announcer informs the viewer that a goal has been scored. Because viewers cannot follow the puck, they do not sustain interest in the game. Although hockey is a popular sport, telecasts of hockey games would have wider appeal and be more fully enjoyed if the movement of the puck could be more closely followed.

In an attempt to make a puck more visible to a viewer, it has been proposed to insert a visible light source in the puck. For example, one proposal included using chemiluminescence to enhance visibility of a puck. Chemiluminescent materials produce phosphorescence glow by converting chemical energy into visible light. In essence, the puck has a core which glows. The glow from the core is then transmitted to the surface of the puck using light channels. Another alternative suggested the use of light emitting diodes as the light source inside the puck. The problem with these proposals is that the puck will look different to the players in the game and to the fans at the arena, and probably will not be bright enough to enhance the visibility of the puck on a television monitor. Because the puck is emitting visible light, it could make it harder for players to see the puck. For example, glare from the puck could hamper a goalie's vision. Furthermore, a puck emitting light may blend in with the ice or arena lights. Although television viewers have problems seeing the puck, fans and players at the arena are able to see the puck because the puck is black against a white surface. Having the puck emit light reduces its contrast and makes it harder for people at the arena to see the puck. Finally, using chemicals to produce light has inherent dangers in instances where the puck breaks and chemicals leak out.

Another proposal included coating the puck with a retroreflective material which reflects light directly back to the source of the light. To enhance the puck, a light source is placed near the television camera in order to direct a beam of light at the puck. This beam of light would then be reflected back to the television camera enhancing the visibility of the puck. One problem is that light may be incident upon the puck from other sources than the light source at the television camera. For example, the arena may have light sources which cause light to be reflected off the puck. These reflections could change the visibility of the puck for the fans and the players. Another problem is that many television broadcasters place cameras behind the goal. If these cameras are coupled to a light directed at the puck, the reflection from the puck could be directly in the goalie's eyes. Furthermore, retroreflective material on the surface of a hockey puck could change the size, color, texture or coefficient of friction of the hockey puck, thus, altering the game.

The above solutions have not been successful and have not been adopted by the established hockey leagues because they change the visibility of the puck for the players and fans at the arena. Thus, there is need for a hockey puck which is more visible to the television viewer, but looks the same as a conventional puck to the players and fans at the arena. Furthermore, for any new hockey puck to be adopted by the established leagues, the new puck must have the same relative size, weight and elasticity as a conventional puck.

SUMMARY OF THE INVENTION

The present invention is directed to overcome the disadvantages of the prior art. Thus, the present invention provides for a hockey puck that transmits electromagnetic signals outside of the visible spectrum that can be detected by appropriate sensors in order to make the hockey puck more visible to the television viewer.

The present invention utilizes a cylindrical body having a flat upper surface and a flat lower surface. An electromagnetic transmitter, completely disposed inside the cylindrical body, transmits an electromagnetic signal not visible to the human eye. Because the transmitter would be completely inside the hockey puck, the look, shape and size of the hockey puck would remain the same as a conventional puck. The transmitter would transmit electromagnetic signals to one or more receivers. In order to prevent the players and fans from noticing that the hockey puck is transmitting signals, the transmitted signal are outside of the visible spectrum. The electromagnetic transmitter could be an infrared emitter, ultraviolet emitter, radar repeater, radar transponder or RF signal transmitter. One or more receivers would use the signals to determine the location of the hockey puck in the arena. Knowledge of the hockey puck's actual location in three dimensional space in conjunction with the pan, tilt, and zoom of the television camera could be used to determine the puck's location in the television frame. That portion of the video frame displaying the puck can be enhanced by making the puck bigger, brighter, or using another symbol to call attention to the puck for the television viewer.

The various electromagnetic transmitters are housed inside a recess in the puck. The transmitters can be secured within the puck using an epoxy or another adhesive having similar elasticity as a conventional puck. Thus, any gaps in the recess not occupied by the electronics of the electromagnetic transmitter can be filled with epoxy.

In one embodiment, the electromagnetic transmitter includes a plurality of sets of infrared emitting diodes. The diodes could be turned on using a shock sensor. A timer could be used to turn off the diodes after a predetermined period of time before all available power has dissipated. The diodes, while turned on, could be continuous or pulsed. Alternatively, the puck could include an RF receiver which would receive a signal commanding the puck to turn on or pulse.

Another embodiment includes embedding a radar repeater inside the puck. The radar repeater receives a first signal and transmits a second signal which is substantially similar to the first signal but can have a predetermined change in the frequency. The predetermined change in frequency can be chosen such that the second signal indicates that the puck is located a distance from a receiver substantially farther than the puck actually is from the receiver.

A third embodiment utilizes an RF transmitter inside the puck to transmit a radio signal to one or more receivers. Different pucks could have unique RF signals so that the receiver can determine which puck it is locating.

In addition to the novel features and advantages described above, the present invention electromagnetic transmitting hockey puck will further enhance viewer interest because the puck could be used with a system to determine the exact location and speed of the puck for purposes of providing the viewer with real time statistics and broadcast enhancements. For example, sensors reading the electromagnetic signals could determine and report to the viewers the puck's speed, acceleration and distance travelled during a shot on goal. Additionally, the television broadcast can include sound effects such as broadcasting the sound of a hammer hitting a pipe when the sensors determine that the puck hit a goal post. Finally, because electromagnetic sensors can determine the position of the puck, broadcast cameras can be equipped with pan/tilt/zoom servos to automatically follow the electromagnetic transmitting puck.

These and other objects and advantages of the invention will appear more clearly from the following description in which the preferred embodiment of the invention has been set forth in conjunction with the drawings.

DETAILED DESCRIPTION

Figure 1:
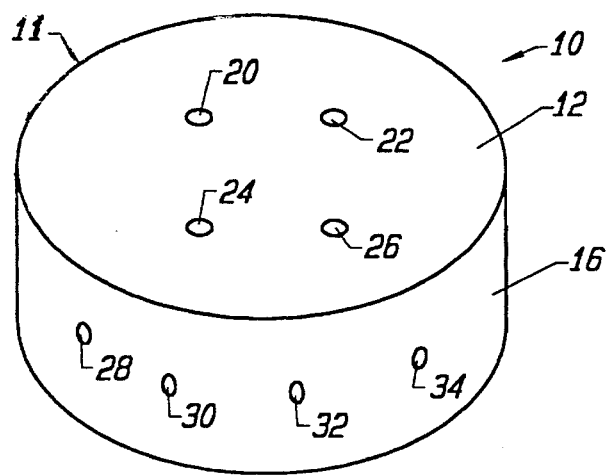
FIG. 1 is a perspective view of a hockey puck according to the present invention.

Conventional hockey pucks are black, cylindrically shaped, 1" thick with a 3" inch diameter, weigh 5 ½–6 ounces and are made of vulcanized rubber. The preferred embodiment of the hockey puck according to the present invention is shown in FIG. 1 and designated generally by the reference numeral 10. Hockey puck 10 is made in accord with conventional specifications and further includes an electromagnetic transmitter. In the preferred embodiment, the electromagnetic transmitter includes infrared emitting diodes. Preferably (although not required), the tip of the diode is sliced off so that the diode can be flush up against the surface of the puck and the angular width of the IR beam will be increased. As will be discussed below, alternatives to infrared emitters includes RF transmitters, radar repeaters and other devices which emit electromagnetic waves outside the visible light spectrum.

Electromagnetic waves include light, radio, X-rays, gamma rays, microwave, infrared, ultraviolet and others, all involving the propagation of electric and magnetic fields through space. The difference between the various types of electromagnetic waves are in their frequency or wavelength. The human eye is sensitive to electromagnetic radiation of wavelengths from approximately 400 to 700 nm, the range called light, visible light or the visible spectrum. Thus, the phrase "electromagnetic signal not visible to a human eye" means an electromagnetic signal outside of the visible spectrum. It is important that the signal transmitted by the hockey puck is not visible to the human eye so that the visual appearance of the puck will not be altered.

Puck 10 is comprised of a rubber body member 11 having a flat top surface 12, a flat bottom surface 14 (shown in FIG. 3) and a side surface or outer circumference 16. At the top surface are shown four infrared emitting diodes 20, 22, 24 and 26, which are fitted in bores in the puck. The bottom surface also has four infrared emitting diodes. Because of the point of view, FIG. 1 only shows four infrared emitting diodes 28, 30, 32 and 34 along outer circumference 16. The preferred embodiment includes twelve infrared emitting diodes along outer circumference 16, spaced apart at 30° intervals. By the phrase "along an outer circumference" it is meant that the diodes are generally spaced at or near the outer circumference. For example, the diodes can be recessed (e.g. 1/16") from the circumference and still be "along the outer circumference." If the diodes are recessed from the circumference, then there may be an indent in the surface of the puck in front of the diode. As an option, the indent could be filled with an IR transparent epoxy or other filling material which would not change the elasticity or color of the puck. Alternatively, a lens could be placed in front of the diode.

Figure 2:
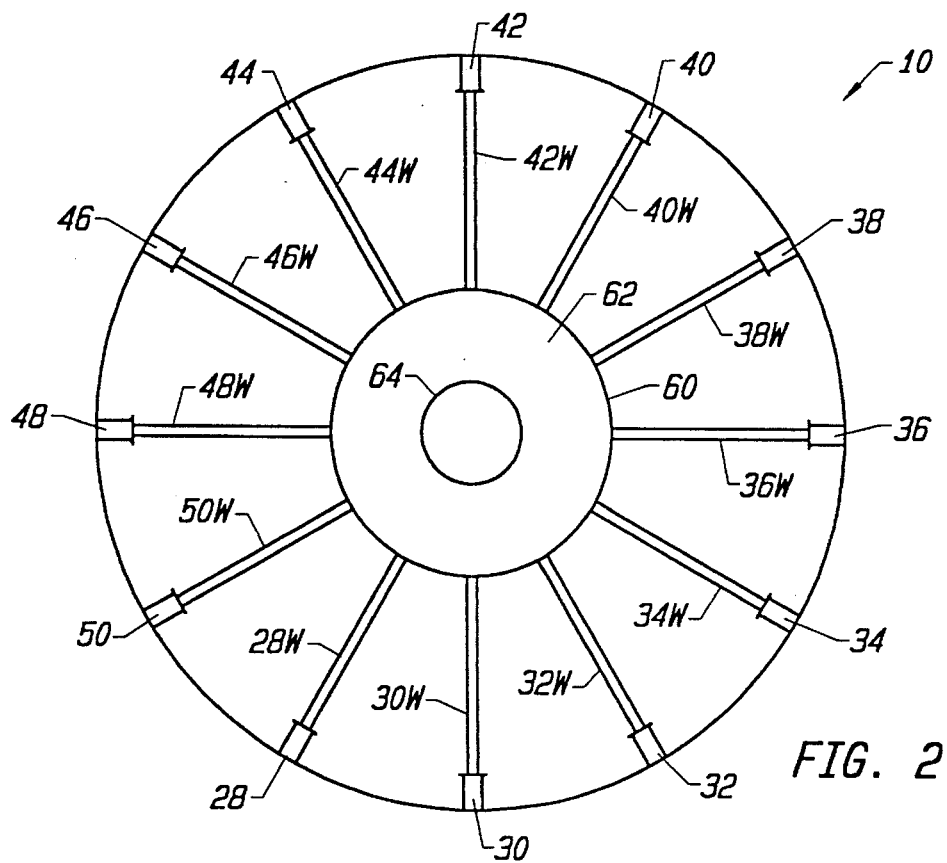
FIG. 2 is a cut-away plan view of the hockey puck of FIG. 1.

FIG. 2 shows a cutaway plan view of puck 10. All twelve diodes (28, 30, 32, 34, 36, 38, 40, 42, 44, 46, 48 and 50) along the outer circumference can be seen. Each diode is housed in a bore approximately the size of the diode. Inside of the puck is a recess 60 which receives printed circuit board 62. Mounted on printed circuit board 62 are electronics and a battery 64. Wires (28w, 30w, 32w, 34w, 36w, 38w, 40w, 42w, 44w, 46w, 48w and 50w) run from printed circuit board 62 to the diodes. Battery 64 can be more than one battery vertically stacked in the center of printed circuit board 62. The preferred battery is a high discharge rate lithium battery which handles cold temperatures well and has high current capability. It is important that the electronics operate sufficiently under cold temperatures because hockey pucks are traditionally frozen prior to use during a hockey game. High current capability is also important so that the infrared emitting diodes can be driven with the high current to maximize the intensity of the IR signal. Battery 64, printed circuit board 62 and the infrared emitting diodes are held in place using a flexible epoxy. The preferred epoxy is DP190 by 3M. Additionally, any gaps in recess 60 not occupied by the electronics could be filled with epoxy to help secure the electronics and to maintain the pucks hardness and elasticity.

Figure 3:
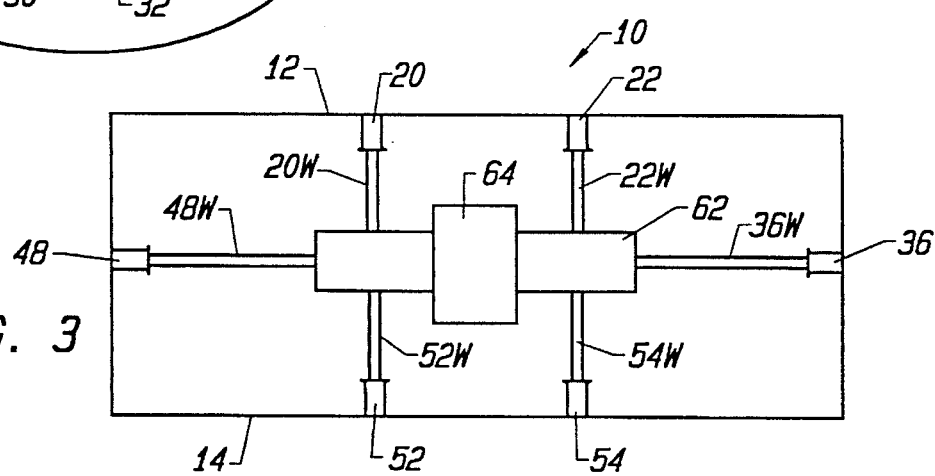
FIG. 3 is a cross-sectional view of the hockey puck of FIG. 1.

FIG. 3 is a side cut-away view of hockey puck 10 showing the bottom surface 14, diodes 52 and 54 on the bottom surface and the wires (20w, 22w, 52w and 54w). As discussed above, there are four diodes along the flat lower surface of the preferred embodiment hockey puck 10. It is clear from FIGS. 2 and 3 that the components of the electromagnetic transmitter are completely disposed inside rubber body member 11. Being "completely disposed inside the rubber body member 11" means that the electromagnetic transmitter does not protrude outside the puck's perimeter, this includes abutting or being flush with the perimeter of rubber body member 11.

Figure 4:
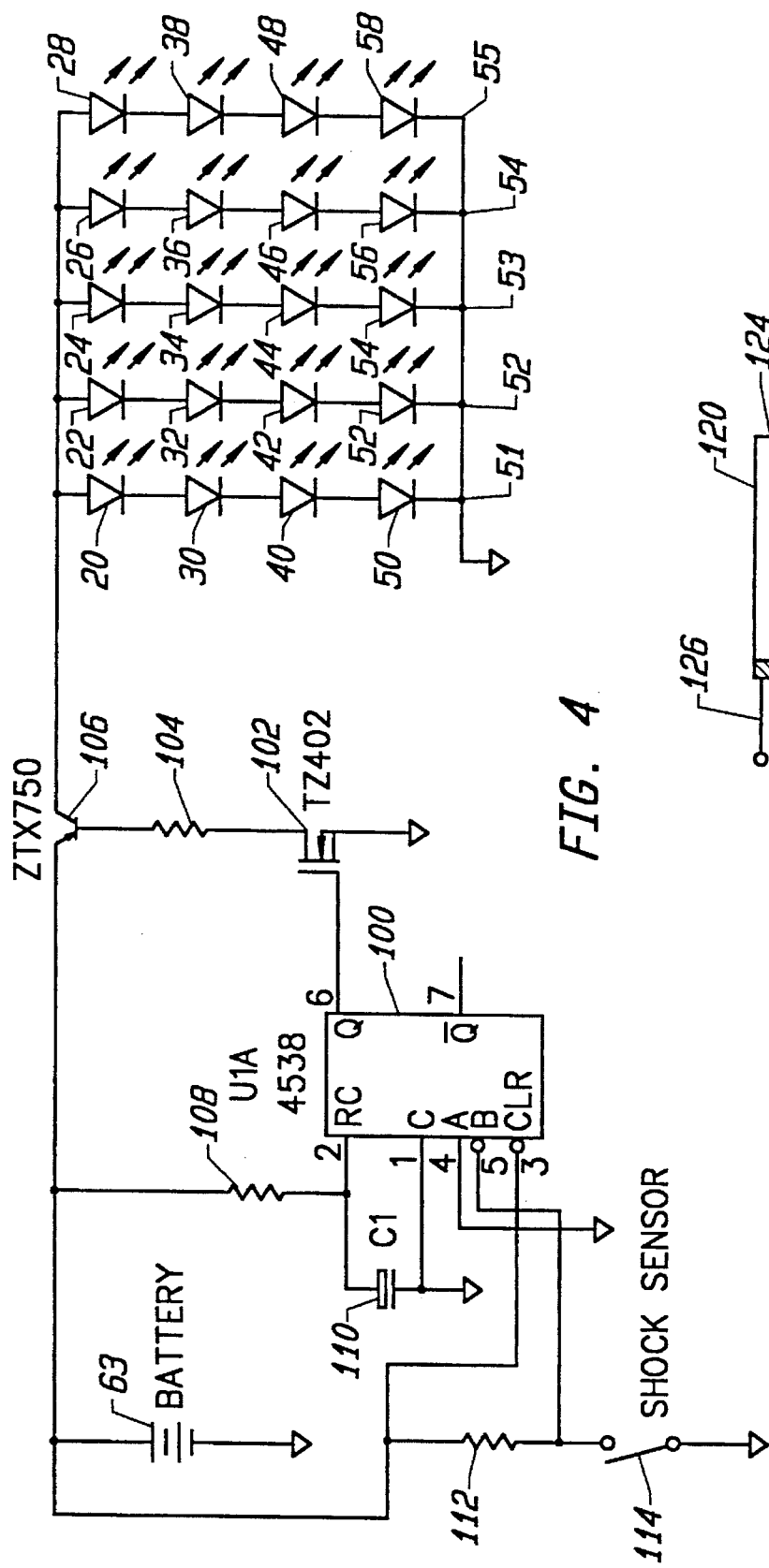
FIG. 4 is one embodiment of electronics for the infrared transmitter of the hockey puck of FIG. 1.

FIG. 4 is a schematic diagram of one alternative electronics package for hockey puck 10. The infrared emitting diodes 20–58 are shown as five strings of diodes (S1–S5). Each string includes four diodes connected in series. The five strings are connected to each other in parallel. Thus, if one diode fails, all of the diodes on the particular string will turn off; however, the other four strings of diodes will remain functional. In accord with this arrangement, the diodes from the various strings are interleaved throughout the puck. That is, the diodes of one string are not located next to each other. Rather, the diodes are mixed. Looking at FIG. 2, each diode is located next to a diode from another string. For example, diode 30 (which is on string S1) is between diode 28 (which is on string S5) and diode 32 (which is on string S2). This arrangement prevents the situation where one diode breaks and the entire side of the puck stops transmitting.

Timing and control circuit 100, which includes an edge trigger and a timer, produces an output interval of a width determined by resistor 108 and capacitor 110. The preferred timing and control circuit is a Motorola MC 4538 which is a dual precision retriggerable/resettable monostable multivibrator which may be triggered from either edge of an input pulse and produce an accurate output interval over a wide range of widths. In the circuit of FIG. 4, battery 63 is made up of two 3 volt batteries in series.

The Q output of timing and control 100 is connected to the gate of FET 102. The source of FET 102 is connected to ground and the drain of FET 102 is connected to the base of transistor 106 across resistor 104. The emitter of transistor 106 is connected to battery 63 and to the RC PIN of timing and control 100 across resistor 108. The RC input of control 100 is connected to capacitor 110 which is connected to the C input of timing and control circuit 100 and to ground. The A pin of timing and control circuit 100 is grounded, and the B pin is connected to a shock sensor and to resistor 112. The clear pin of timing and control circuit 100 and resistor 112 are both connected to battery 63.

Figure 5:
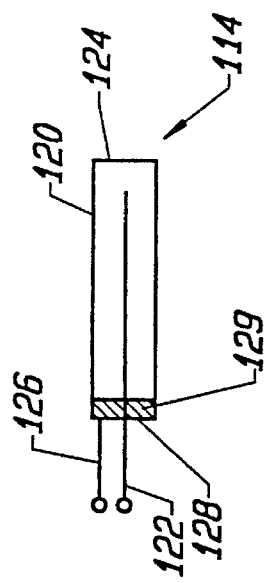
FIG. 5 is a shock sensor.

Shock sensor 114 is used to turn on the circuit when it senses a shock. FIG. 5 is an example of a shock sensor. Shock sensor 114 includes a wire 122 suspended inside a brass or copper tube 120. Wire 122 is attached to cap 128 with epoxy or other insulating material 129 which acts to suspend the wire inside tube 120 in a cantilevered fashion and insulates the wire from tube 120. In one embodiment, cap 128 could be made from the epoxy. Attached to and suspending from tube 120 is another wire 126. When shock sensor 114 is shocked (e.g. puck is jolted or hit) wire 122 bends and touches tube 120 which, for a brief moment, completes the circuit. Timing and control circuit 100 includes an edge detector which senses an edge (the circuit being closed) and turns on the puck.

Figure 6:
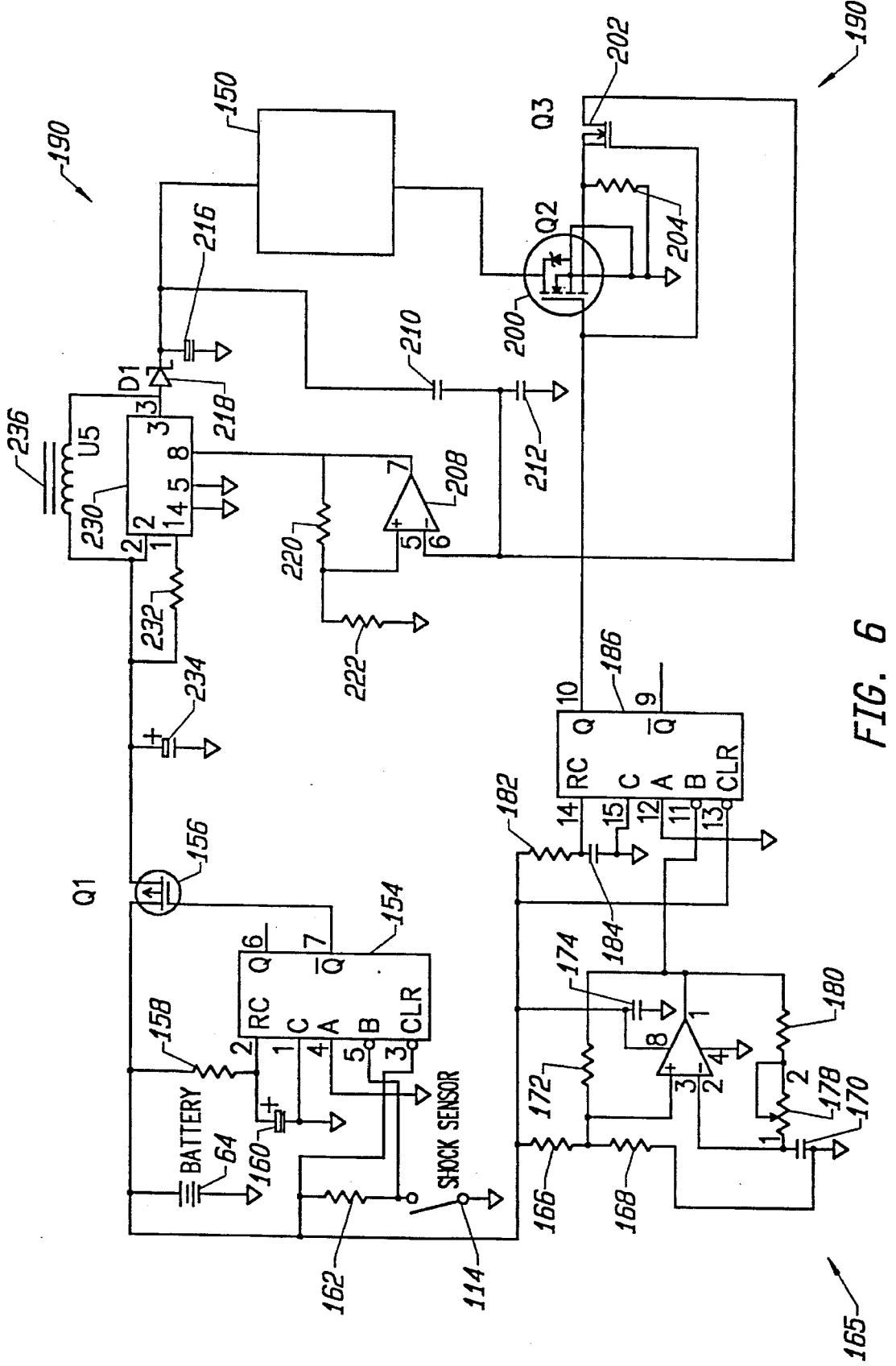
FIG. 6 is the preferred embodiment electronics for the hockey puck of FIG. 1.

FIG. 6 is a schematic of the preferred electronics package for puck 10. Diode bank 150 is the same five strings of four infrared emitting diodes depicted in FIG. 4. Although the preferred embodiment uses twenty diodes, it is possible that the puck can be constructed and will function with more or less than twenty diodes. One diode by itself will produce a signal that can be detected; however, it is advantageous to have more than one diode so that the angle of the puck and location of the puck in regard to other objects will not significantly affect reception of the signal transmitted from the puck. Additional diodes also maximize the output. The preferred embodiment diode is a GaAs infrared emitter LD271 with one inch leads manufactured by Siemens. The LD271 is an infrared emitting diode and emits radiation in the near infrared range (950 nm peak). The device is enclosed in a T 1¾ (5 mm) plastic package. Other infrared emitting diodes that can be used include an infrared laser diode or any other source which transmits an infrared signal.

Battery 64 is made up of four 1.5 volt batteries stacked in the center of PC board 62. FIG. 6 shows timing and control circuits 154 and 186 which are the same multivibrator chip as timing and control circuit 100 in FIG. 4. Timing and control circuit 154 is used to detect the edge from the shock sensor 114, turn on the diodes and automatically turn off the diodes after a predetermined period of time before all available power has dissipated. That is the puck turns off after a preset period of time rather than waiting for the battery to run out. In the preferred embodiment, the diodes are turned off after 45 seconds. This prolongs the life of the battery, allows testing and prevents pucks not in use from transmitting. Connected to the RC input of timing and control circuit 154 is resistor 158 and capacitor 160 used for timing purposes. The output $\overline{Q}$ is connected to FET 156. The A input of control 154 is connected to ground. The B input is connected to shock sensor 114, and the bottom of resistor 162. The top of resistor 162 is connected to battery 64 and the clear pin of control 154.

Unlike the circuit of FIG. 4, the circuit of FIG. 6 does not continuously transmit IR energy. Rather, the diodes are pulsed. The advantage of pulsing the diodes is to extend battery life, to overdrive the diodes to increase the IR signal (e.g. run at two amps instead of 100 milliamps) and to allow for differencing techniques which will be discussed below.

Section 165 of the FIG. 6 schematic diagram includes the electronics that enable the pulse action. The pulsing is achieved using timing and control 186 and amplifier 176. The positive input of amplifier 176 is connected between resistors 166 and 168, and to the output of amplifier 176 across resistor 172. The top of resistor 166 is connected to resistor 162 and the clear pins of timing and control 154 and 186. The bottom of resistor 168 is grounded. One power pin of amplifier 176 is connected to ground while the other is connected to resistor 162 and to ground via capacitor 174. The negative input of amplifier 176 is connected to ground across capacitor 170 and to a potentiometer 178 which in turn is connected to resistor 180. Resistor 180 is also connected to the output of amplifier 176. The output of amplifier 176 is connected to the B input of the timing and control 186. The A input of timing and control 186 is connected to ground. The C input of timing and control 186 is connected to ground and to the RC input across capacitor 184. The RC input of timing and control 186 is also connected to the clear pin across resistor 182. The Q output of timing and control 186 is connected to the gate of power MOSFET 200, preferably an IRCZ24 by International Rectifier, and to the gate of MOSFET 202.

The sections of the circuit labelled 190 are used as a current regulating switching power supply so that a high current can be passed through the diodes when the diodes are pulsed on. This circuit will produce ten amps of current to pass through diode bank 150. Because the diodes are divided into five strings which are connected in parallel, each string receives two amps. Because each string includes four diodes connected in series, each diode will receive two amps of current. The source of Power MOSFET 200 is grounded and connected to resistor 204. Resistor 204 is also connected to the current sense of Power MOSFET 200. The Kelvin source of Power MOSFET 200 is connected to the source. The current sense is connected to the source of MOSFET 202 and to ground across resistor 204. The drain of power MOSFET 200 is connected to the diode bank 150.

The drain of MOSFET 202 is connected to the negative input of amplifier 208 and between capacitors 210 and 212. Capacitor 212 is tied to ground. Capacitor 210 is connected to diode bank 150, capacitor 216 (which is tied to the ground) and diode 218. Amplifier 208 has a feedback loop which consists of resistor 220 and resistor 222 which is tied to ground. The output of amplifier 208 is also connected to the auxiliary gain block output of converter 230. The positive input of amplifier 208 is connected between resistors 220 and 222.

Converter 230 is a micropowered DC converter. The preferred embodiment chip is an LT1073 from LINEAR Technology. Current limiting pin 1 of converter 230 is connected to the input supply voltage (pin 2 of converter 230) across resistor 232 and to ground across capacitor 234. The input supply voltage of converter 230 is connected to inductor 236 which is also connected to the collector of the power transistor of converter 230 (pin 3). The collector of the power transistor of the converter (pin 3) is also connected to diode 218.

The circuit of FIG. 6, which is arranged on PC board 62, provides for 0.0005 second pulses at 60 Hz. Modifications to the circuit can be made to provide for 0.0001 sec pulses at 30 Hz. The pulses begin when the shock sensor is shocked. The pulses end 45 seconds later. If the shock sensor receives a shock while the puck is pulsing, the 45 second clock is reset. A shock sensor is one means to insure that the puck is on during play. It is anticipated that the shock to the puck when the referee drops the puck for a face off will provide the shock necessary to trigger the circuit. While in play the puck should be hit by a player's stick or the boards at least once every 45 seconds. Therefore, while in play, the puck should always be on. During the course of a game, pucks are sometimes hit out of play. That is, a shot by a player goes over the boards and into the seating area. At that point it is desirable that the puck turn off. Thus, the timer is used to turn the puck off 45 seconds after the last shot. This prevents the arena from being filled with pucks continuously on.

There are at least four approaches to manufacturing a puck in accordance with the present invention. First, the electronics can be supported in an injection mold and vulcanized rubber can be injected around it. Second, the device can be in a preloaded package that is molded into a puck. Third, pucks can be molded into two halves with a recess in each half so that the electronics can be fitted in the combined recess when the two halves are assembled together. Fourth, existing conventional pucks could be machined and reassembled with the electronics package (retrofitting). In the fourth approach, half of two pucks would be sliced away. A recess would becarved into the remaining two halves as well as bores for each of the diodes. There is also a need to carve a very thin passage way to house the leads from the electronics to the diodes. The inventors envision various other manufacturing options that are compatible with the present invention.

Puck 10 can be used in a system with an infrared receiver(s) for detecting the location of the puck either in three dimensional space or the location of the puck in a video frame. An infrared receiver can determine the angle or direction of the puck from the receiver using techniques known in the art. Two or more infrared receivers can be used to determine the three dimensional location of the puck. The three dimensional location coordinates of the puck could be used to locate the puck in the television image and alter the television signal to enhance the visibility of the puck. For example, the puck in the TV image can be altered by outlining the puck or replacing the puck with a different symbol.

Figure 7:
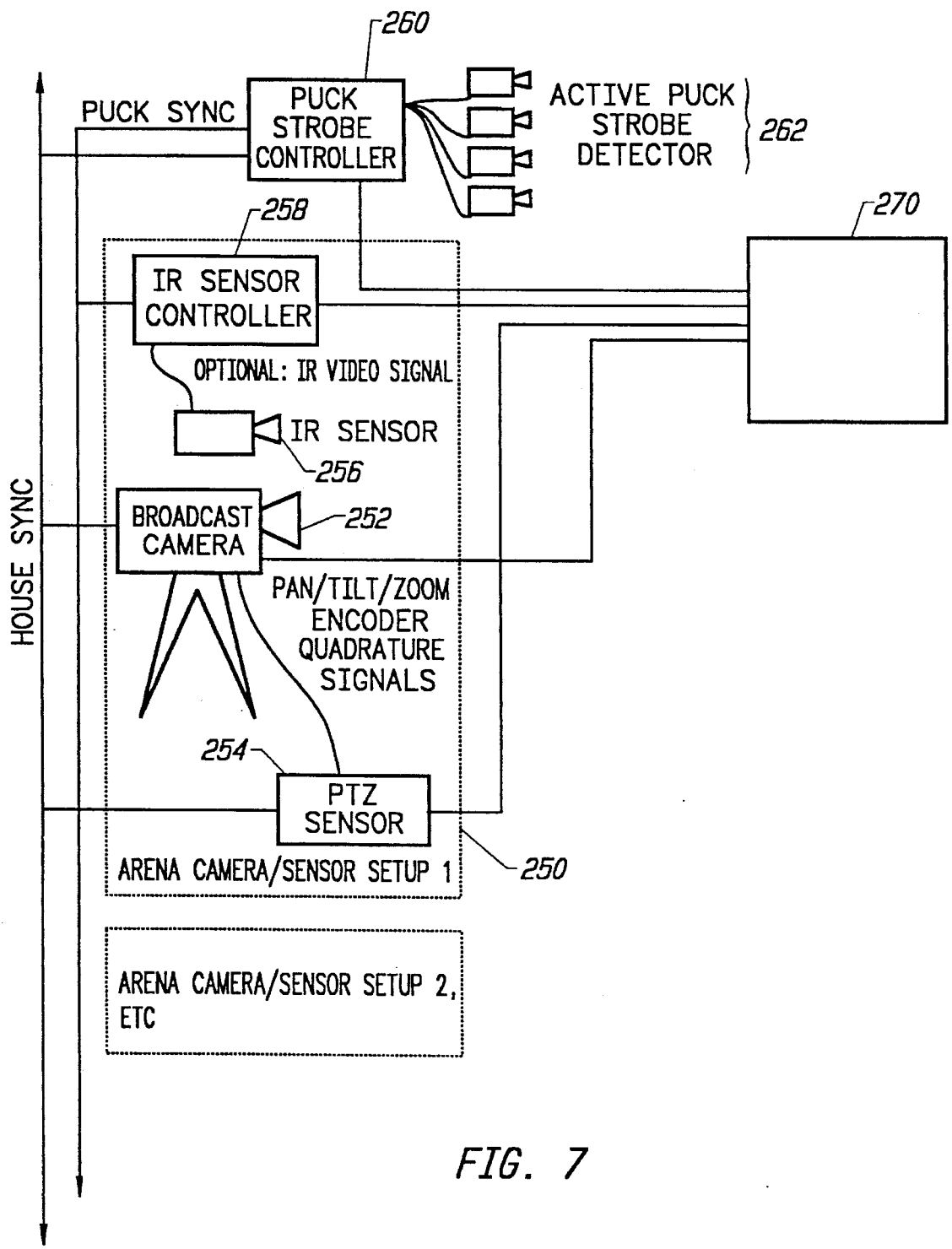
FIG. 7 is a block diagram of a puck tracking system utilizing the hockey puck of FIG. 1.

One example of such a system is found in FIG. 7. The system includes one or more camera sensor setups 250, which includes a broadcast camera 252. Camera sensor setup 250 also includes a Pan-Tilt-Zoom (PTZ) sensor 254 which senses the pan, tilt and zoom of broadcast camera 252 (e.g. using optical encoders). Setup 250 also includes IR sensor 256 which senses the IR signal from puck 10. Connected to IR sensor 256 is IR sensor controller 258 which controls IR sensor 256 and partially processes the signal from IR sensor 256. IR sensor controller 258 is connected to a puck strobe controller unit 260 which is connected to a series of active puck strobe detectors 262. Although there can be many setups 250, there is only one puck strobe controller and one set of detectors 262 in an arena.

Using the information from the puck strobe controller and the IR sensor, the IR sensor controller 258 causes the IR sensor to capture the data at the relevant times. Active puck strobe detectors 262 detect when the puck is pulsing on and when the puck is between pulses. Using this information, the IR sensor will record a frame of IR data when the puck is pulsed on and a frame of IR data when the puck is between pulses. The two sets of data are subtracted from each other. Ideally, the two sets of data should be similar except that in one set of data the puck is on and in the other set of data the puck is not detected by the IR sensors. Thus, when subtracting the two frames of data, the only significant data remaining is the puck. This technique is called temporal differencing.

The infrared emitting puck can also be used as part of a system that performs spectral differencing. Two infrared detectors are used whereby one detector senses infrared signals within a first bandwidth that includes the frequency of the signal emitted from the puck. The second detector senses infrared signals within a second bandwidth mutually exclusive to the first bandwidth. The two bandwidths are relatively close to each other in the electromagnetic spectrum. The signal from the two detectors are subtracted from each other removing a majority of the signals detected, with the exception of the puck's signal since the puck's signal can only be sensed by the first detector. Both differencing techniques are useful for filtering out sources of infrared signals other than the puck.

The IR data from the sensor is sent to a graphics processing system 270. During a broadcast of a hockey game, the graphics processing system 270 is likely to be located in a truck outside the arena. The processor will use the data from the infrared sensor 256, utilizing the differencing technique described above, to determine the direction of the puck from the IR sensor. The three dimensional location of the puck can be determined if the direction of the puck from two IR infrared sensors is known.

In the preferred approach, the arena would be equipped with many infrared sensors and the computer will use data from more than one sensor to determine the exact location in three dimensional space of the hockey puck in the arena. Then, utilizing the information from the PTZ controller 254, the processor 270 determines where the camera is pointing and what the field of vision of the camera is in three dimensional space. Knowing the pointing angles of the camera, the field of vision of the camera and the location of the puck, the processor can determine where in the field of vision the puck would be and then edit the video information accordingly. In an alternative approach where the system includes only one IR sensor and one broadcast camera, the system could determine where the puck is in the video frame (without finding the puck's 3D coordinates) and then edit the video frame accordingly.

The system as shown in FIG. 7 is one embodiment of an IR tracking system that can utilize the signals from the preferred embodiment puck 10. Many other alternative systems for detecting infrared transmitting objects can also be used to track the hockey puck.

Although the preferred embodiment uses infrared signals to track a hockey puck, other electromagnetic signals outside the visible light spectrum could also be used. For example, a puck could be tracked using radar.

A radar based detection system relies on energy scattered or reflected back to the radar from an object of interest. In the hockey application, the energy scattered from a conventional puck is lost in all the undesired back scattered energy (clutter) from the players, the rink, the building, etc. In order to make the puck stand out among all this clutter, the radar signal is augmented with an electronic repeater. The puck's emission is made stronger and given a unique signature which makes it easily detected through all the clutter. An active repeater is preferred over a passive reflecting hockey puck because it provides a much higher signal to noise ratio.

Using radar with an active repeater to track a hockey puck has several desirable qualities. First, in addition to having inherently high ranging accuracy of a few inches, RF in the low microwave band efficiently passes through dielectric materials, such as hockey sticks and partially defracts around optically opaque objects such as ice skate blades and human bodies. Thus, the puck is visible to the radar a substantial percentage of the time. Second, the repeater electronics in the puck is entirely confined within the rubber of the puck and is thus concealed. Third, puck modulation can be channelized so that errant pucks lost in the crowd cannot be turned on and interfere with the active game puck.

Figure 8:
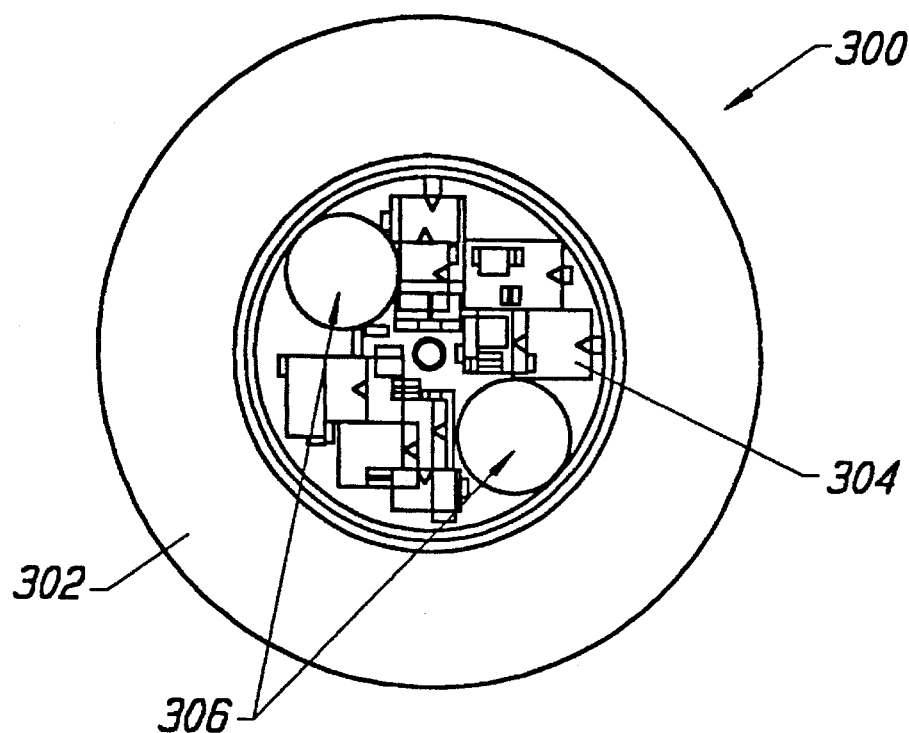
FIG. 8 is an elevational cut-away view of a second embodiment hockey puck according to the present invention.
Figure 9:
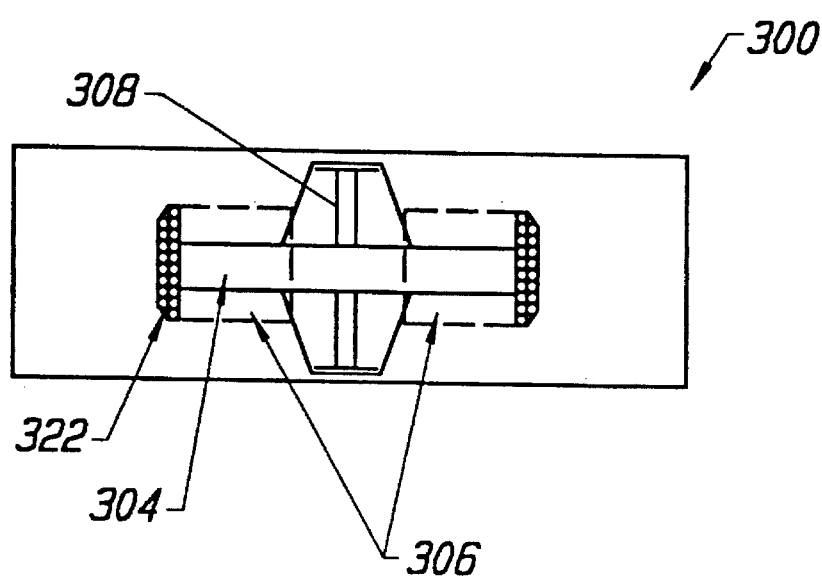
FIG. 9 is a cross-sectional view of the hockey puck of FIG. 8.

FIG. 8 shows a second embodiment hockey puck 300 to be used with a radar system. Completely embedded within rubber section 302 of puck 300 is radar repeater 304, which uses a gated repeater architecture. Repeater 304 receives, amplifies, modulates and retransmits the instant radar signal. FIG. 9 is a side cut-away view of puck 300 showing repeater 304 with batteries 306 and antenna 308. In the preferred embodiment, batteries 306 includes two ⅓N lithium ion primary cells.

Figure 10:
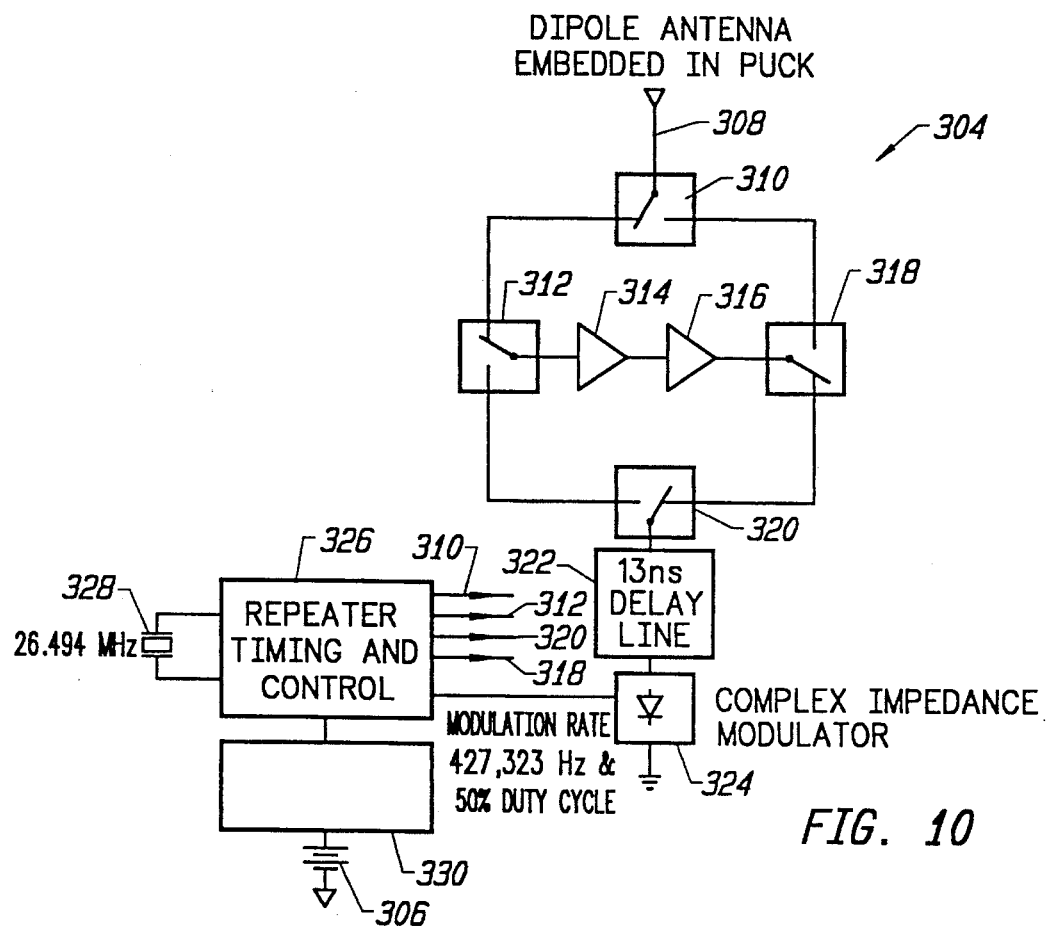
FIG. 10 is a block diagram of the electronics of the radar repeater in the hockey puck of FIG. 8.

FIG. 10 is a block diagram of the radar repeater 304. A signal is detected by dipole antenna 308 (which is completely embedded in puck 300) and then passes through a switch and amplifier network. First, the received signal passes through switch 310 to switch 312 and then to amplifiers 314 and 316. After the amplifiers, the received signal passes through switch 318 followed by switch 320. After leaving the switch and amplifier network, the received signal fills up a 13 ns delay line 322, which in the preferred embodiment is a coaxial cable. Connected to delay line 322 is a complex impedance modulator 324 which modulates the radar signal by varying the reflection coefficient at the end of the cable at a rate of 427,323 Hz. Preferably, modulator 324 is a PIN diode which is turned off and on (modulated open and closed) causing the phase of the received RF signal to be alternately shifted between 0° and 180°. Modulator 324 receives a modulation signal of 427,323 Hz from repeater and timing and control circuit 326. Control circuit 326 also controls switches 310, 312, 318 and 320. Connected to control circuit 326 is crystal 328 for creating a clock signal oscillating at 26,494 MHz.

The modulation performed by repeater 304 is biphase shift key modulation (BPSK), which creates two signals which have frequencies that vary from the incident signal by the modulation rate. The first signal has the same basic shape and amplitude as the incident signal, but with a frequency equal to the sum of the frequency of the incident signal and the modulation rate. In the preferred radar puck, the modulation rate is 427,323 Hz. The second signal has the same basic shape and amplitude as the incident signal, but with a frequency equal to the difference between frequency of the incident signal and the modulation rate.

In the receive portion of the cycle, the switches are as drawn in FIG. 10. When delay line 322 is full, the repeater switches to transmit mode where control 326 reverses switches 310, 312, 318 and 320, and the signal flows out of the delay line, through switch 320 to switch 312, through amplifier 314 followed by amplifier 316, through switch 318 to switch 310 and finally to antenna 308. Repeater 304 switches between receive and transmit at a rate of 26.494 MHz. One reason for the 13 ns delay in line 322 is to allow time to change the four switches.

The circuit of FIG. 10 has a shock activated switch and timer 330 which includes an RC decay timer which turns off the repeater after 45 seconds and a shock sensor which is used to turn on the circuit. Repeater 304 could have many (e.g. twenty) permanently programmed unique modulation channels. Thus, different pucks can modulate at different rates using control circuitry in timing and control circuit 326. Alternatively, an RF signal could be sent to the puck to indicate which modulation rate to use. Thus, the base radar unit could determine the signature of each puck. Either way, a puck could be readily identifiable and differentiated from other pucks and other sources of RF transmission.

In theory, a radar base unit sends out a signal which is received by the repeater inside the puck. The repeater amplifies, modulates and retransmits the signal back to the radar base unit. The radar base unit uses a difference in frequency to determine how far the puck is from the unit. The location of the puck in three dimensional space can be determined by using three radar base units simultaneously because the location of the puck can be determined from knowing how far it is from three known points.

One method for using puck 300 is for the radar base unit to send out a frequency swept signal called a chirp which may, for example, be a sine wave with a constant amplitude and a frequency which is incrementally stepped over a given period of time. Preferably, a low power S-band radar is used to send signals to the puck in the microwave range. When the radar base unit receives the signal which has been sent by the puck, the radar base unit determines the difference between the frequency of the signal received from the puck and the frequency of the signal currently being sent as part of the chirp. The difference in frequencies can be used by techniques known in the art to determine the distance of the puck from the radar base unit.

Repeater 304 has the added feature that it modulates the radar signal, as described above, to create two signals which have frequencies that vary from the incident signal by the modulation rate. The modulated signal from the puck, when received by the radar base unit, would have the same frequency as a signal from an object much further than where the puck actually is. That is, a radar base unit would determine that the puck was at a phantom site five to ten times further than the actual location of the puck (e.g. that the puck was outside the arena). Since other objects actually at the phantom site would not be able to reflect a strong signal back to the radar base unit, the puck would stand out as the loudest object near the phantom location. A radar base unit could filter out signals received from objects not at the phantom location (e.g. most objects in the arena), allowing the puck to be located with minimal interference from any unwanted clutter.

Figure 11A:
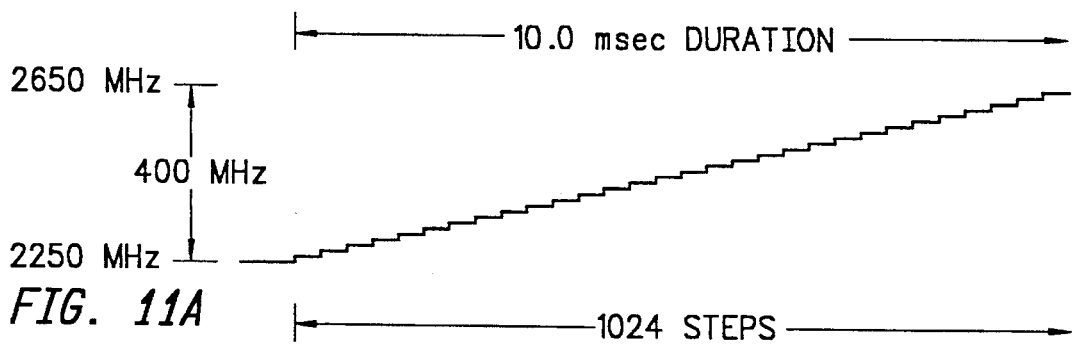
FIGS. 11A–C describes the preferred waveforms used in conjunction with the hockey puck of FIG. 8.
Figure 11B:
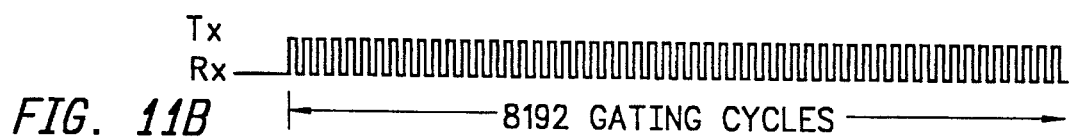
Figure 11C:
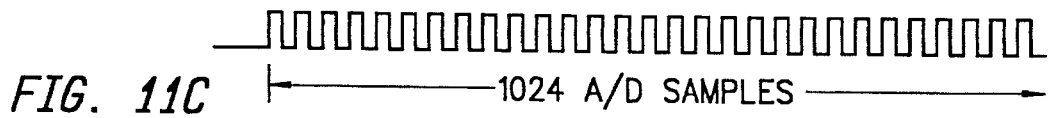
Figure 12:
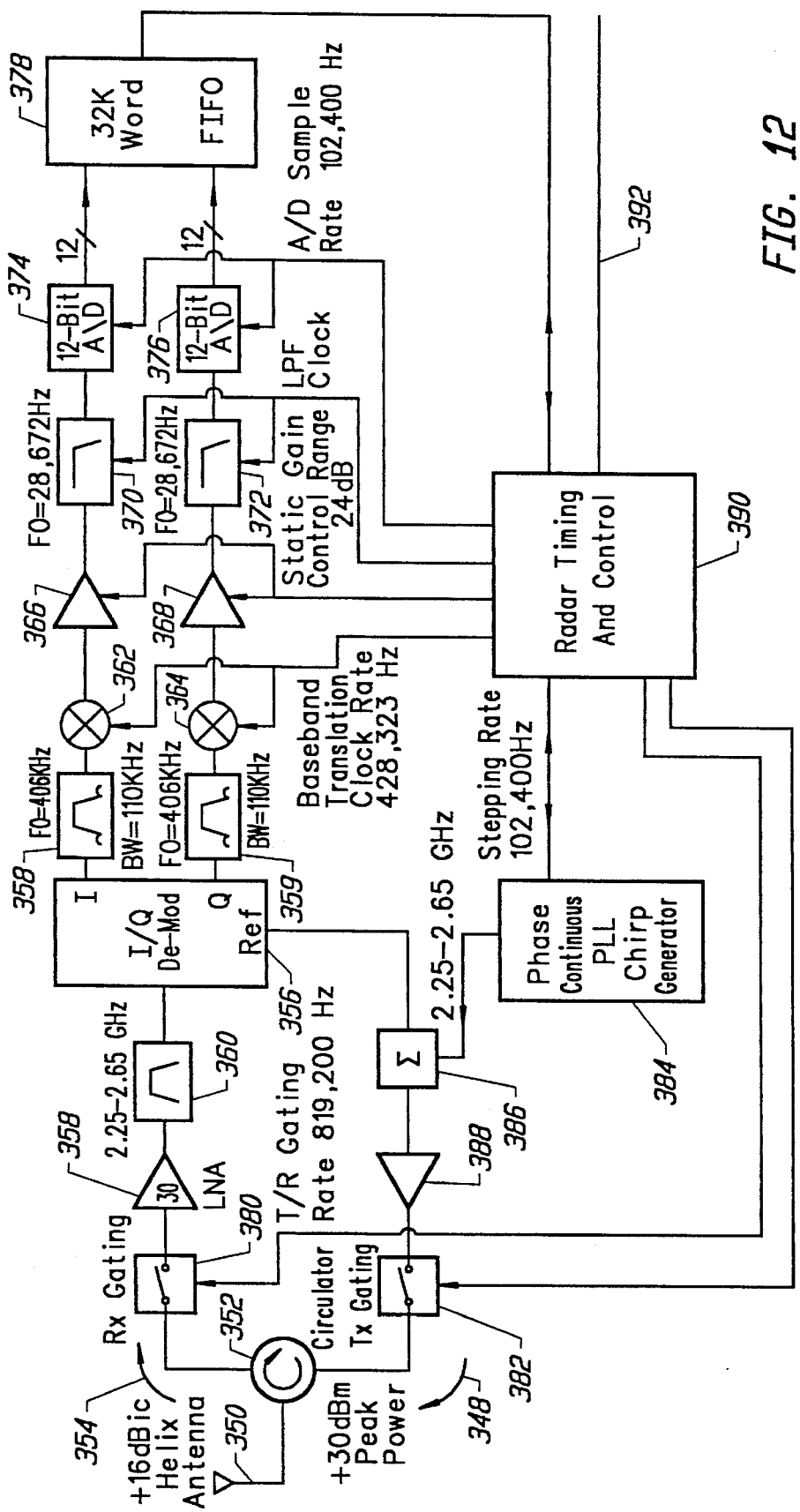
FIG. 12 is a block diagram of an exemplar radar base unit which can be used in conjunction with the hockey puck of FIG. 8.

FIGS. 11A–C shows exemplar radar waveforms that can be used with puck 300. The chirp, shown in FIG. 11A, includes 1024 steps from 2.25 GHz to 2.65 GHz in a ten millisecond period. As described above, the radar base unit alternates between transmit and receive mode during the chirp. FIG. 11B shows the gating cycle between transmit and receive for the radar base unit which indicates that the radar base unit switches between transmit and receive modes at eight times the frequency stepping rate (819,200 Hz). Thus, for each step in a chirp, the incoming signal to the radar base unit is integrated over eight transmit and receive cycles. As shown by FIG. 11C, 1024 12-bit in-phase and quadrature sample pairs are taken for each 10 msec chirp.

Many systems can be designed to utilize the advantages of puck 300. One exemplar radar base unit, shown in FIG. 12, uses a homodyne conversion architecture with a gated Frequency Modulated Continuous Wave (FMCW) format. Waveform gating allows the use of a single antenna while the FMCW format allows maximal RF efficiency with minimal information bandwidth. The radar operates with a peak power of one watt, a center frequency of 2.45 GHz, and a FMCW bandwidth of 400 MHz.

The radar base unit of FIG. 12 includes two signal paths: a transmit path 348 and a receive path 354. Gates 380 and 382 are used to open and close the transmission and reception paths which alternate, as discussed above with respect to FIG. 11B. The transmit path will be discussed first. Under the control of radar timing and control circuit 390, a phase continuous phase locked loop chirp generator 384 creates the output waveform and counts in increments of frequency in 1024 steps from 2.25 GHz to 2.65 GHz. The waveform is sent to splitter 386 where substantially identical signals are sent to demodulator 356 (which is part of the receive path) and to amplifier 388 which amplifies the signal to one watt. After amplifier 388, the signal is applied to the +16 dBic helical radar antenna 350 through circulator 352.

A signal is received by antenna 350 and is passed through circulator 352 into a low noise preamplifier 358. The signal is then passed through filter 360 to remove unwanted energies, for example, cellular phone and satellite signals. The filtered signal is transmitted to demodulator 356, which creates in-phase (I) and quadrature (Q) outputs, both of which are filtered (358 and 360) to remove unwanted noise. The two signals are then sent to multipliers 362 and 364 which perform base band translation, at a clock rate of 428,323 Hz. The two signals are then transmitted to amplifiers 366 and 368, and sent through filters 370 and 372. The filtered signals are converted to digital signals in A/D converters 374 and 376, and stored in FIFO 378 before being transmitted to a computer (not shown) via line 392 for processing.

The computer triggers the radar base unit to transmit one chirp via communicating with control 390 over line 392. After the chirp, the I/Q samples are read from the radar base unit and processed to extract the puck signal and then calculate its distance. In actual operation this process would happen at the video field rate of 60 Hz. Although the described radar repeater and radar base unit use a specific modulation scheme, the exact modulation scheme used is not critical to the inventive concept and many other suitable modulation schemes may be substituted.

In a further alternative embodiment, the puck would include an RF transmitter rather than containing a radar repeater. Multiple receiving units could receive the transmitted RF signal and determine the differential distance between the puck and any combination of two receiving units. The three dimensional location of the puck can be determined by using at least four receiving units. Another alternative includes a puck with an RF transmitter and receiver. The base unit sends a signal to the puck indicating when the puck should transmit. The base unit can be used to turn on one specific puck at a unique frequency so that pucks not in use will not transmit any signals and the base unit can determine which signal is coming from the puck.

The foregoing detailed description of the invention has been presented for purposes of illustration and description. It is not intended to be exhaustive or to limit the invention to the precise form disclosed and obviously many modifications and variations are possible in light of the above teaching. The described embodiments of electromagnetic hockey pucks were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An electromagnetic transmitting hockey puck, comprising:

a cylindrical body having a flat upper surface and a flat lower surface; and an electromagnetic transmitter, completely disposed inside said cylindrical body, said electromagnetic transmitter adapted to transmit an electromagnetic signal not visible to a human eye.

2. An electromagnetic transmitting hockey puck according to claim 1, wherein said electromagnetic transmitter includes a power source.

3. An electromagnetic transmitting hockey puck according to claim 1, wherein said electromagnetic transmitter includes a shock sensor which turns on said electromagnetic transmitter when said puck is shocked.

4. An electromagnetic transmitting hockey puck according to claim 1, wherein said electromagnetic transmitter includes a timer that turns off said electromagnetic transmitter automatically after a predetermined period of time but before all available power has dissipated.

5. An electromagnetic transmitting hockey puck according to claim 1, wherein said hockey puck has a thickness and shape similar to a conventional hockey puck.

6. An electromagnetic transmitting hockey puck according to claim 1, wherein said electromagnetic transmitting hockey puck is a retrofitted conventional hockey puck.

7. An electromagnetic transmitting hockey puck according to claim 1, wherein said electromagnetic transmitter includes an infrared emitter.

8. An electromagnetic transmitting hockey puck according to claim 7, wherein said infrared emitter includes an infrared emitting diode.

9. An electromagnetic transmitting hockey puck according to claim 7, wherein said infrared emitter pulses.

10. An electromagnetic transmitting hockey puck according to claim 7, further including a receiver completely disposed inside said cylindrical body and in communication with said electromagnetic transmitter so that said infrared emitter will pulse in response to said receiver receiving a predetermined signal.

11. An electromagnetic transmitting hockey puck according to claim 1, wherein said electromagnetic transmitter includes at least two sets of infrared emitters connected in parallel, each of said sets including at least two emitters connected in series.

12. An electromagnetic transmitting hockey puck according to claim 11, wherein at least a first subset of said infrared emitters are arranged substantially along an outer circumference of said cylindrical body.

13. An electromagnetic transmitting hockey puck according to claim 12, wherein said infrared emitters are arranged in an interleaving manner.

14. An electromagnetic transmitting hockey puck according to claim 12, wherein at least a second subset of infrared emitters are arranged substantially along said flat upper surface and said flat lower surface.

15. An electromagnetic transmitting hockey puck according to claim 1, wherein said electromagnetic transmitter includes a radar repeater.

16. An electromagnetic transmitting hockey puck according to claim 15, wherein:
said radar repeater receives a first signal having a first frequency, modulates said first signal at a modulation rate and transmits said modulated signal.

17. An electromagnetic transmitting hockey puck according to claim 16, wherein said modulated signal includes a tone having a frequency equal to said first frequency plus or minus said modulation rate.

18. An electromagnetic transmitting hockey puck according to claim 16, wherein:
said puck is at a first position; and
said modulated signal indicates that said puck is at a phantom position farther from a source of said first signal than said first position.

19. An electromagnetic transmitting hockey puck according to claim 1, wherein said electromagnetic transmitter includes an RF transmitter.

20. An electromagnetic transmitting hockey puck, comprising:
a cylindrical body having a flat upper surface and a flat lower surface; and
a means for transmitting an electromagnetic signal not visible to a human eye.

21. An electromagnetic transmitting hockey puck according to claim 20, wherein said means for transmitting includes means for starting said means for transmitting when said puck is shocked.

22. An electromagnetic transmitting hockey puck according to claim 20, wherein said means for transmitting includes means for turning off said means for transmitting automatically after a predetermined period of time but before all available power has dissipated.

23. An electromagnetic transmitting hockey puck, comprising:
an infrared transmitter including control electronics and a plurality of infrared emitting diodes; and
a cylindrical body having a flat upper surface, a flat lower surface, a recess for receiving said control electronics and a plurality of bores for receiving said diodes, a first subset of said bores being displaced substantially along an outer circumference of said cylindrical body, a second subset of said bores located substantially along said flat lower surface, a third subset of said bores located substantially along said flat upper surface.

24. An electromagnetic transmitting hockey puck according to claim 23, wherein said control electronics includes:
a battery for supplying power to said diodes;
a shock sensor that turns on said infrared emitter if a shock is detected; and
a timer that turns off said infrared emitter after a predetermined period of time but before all available power has dissipated.

25. An electromagnetic transmitting hockey puck according to claim 23, wherein:
said control electronics is secured within said body with an adhesive;
any gaps in said recess not occupied by said control electronics are substantially filled with said adhesive; and
said adhesive having an elasticity or hardness substantially similar to an elasticity or hardness of said body.

26. An electromagnetic transmitting hockey puck according to claim 23, wherein said plurality of infrared emitting diodes are located in said bores in an interleaved arrangement.

* * * * *

UNITED STATES PATENT AND TRADEMARK OFFICE
CERTIFICATE OF CORRECTION

PATENT NO. : 5,564,698
DATED : October 15, 1996
INVENTOR(S) : Honey, et al.

It is certified that error appears in the above-indentified patent and that said Letters Patent is hereby corrected as shown below:

Col. 9, line 31: after "accordingly." and before "alternative" delete "Inan" and substitute therefor --In an--.

Col. 10, line 30: after "at" and before "MHz." delete "26,494" and substitute therefor --26.494--.

Col. 12, line 15: after "band" and before "at" delete "translation," and substitute therefor --translation--.

Signed and Sealed this

Thirteenth Day of October 1998

Attest:

BRUCE LEHMAN

Attesting Officer

Commissioner of Patents and Trademarks